United States Patent
Chang et al.

(10) Patent No.: US 8,920,180 B2
(45) Date of Patent: Dec. 30, 2014

(54) PORTABLE ELECTRONIC DEVICE AND CONNECTING PORT THEREOF

(75) Inventors: Hung-Tien Chang, Taipei (TW); Chien-Chia Huang, Taipei (TW); Po-Wei Shih, Taipei (TW)

(73) Assignee: Compal Electronics, Inc., Taipei (TW)

( * ) Notice: Subject to any disclaimer, the term of this patent is extended or adjusted under 35 U.S.C. 154(b) by 260 days.

(21) Appl. No.: 13/562,301

(22) Filed: Jul. 30, 2012

(65) Prior Publication Data

US 2013/0034979 A1    Feb. 7, 2013

Related U.S. Application Data

(60) Provisional application No. 61/514,456, filed on Aug. 2, 2011.

(51) Int. Cl.
| | |
|---|---|
| *H01R 13/44* | (2006.01) |
| *H01R 13/60* | (2006.01) |
| *H01R 13/50* | (2006.01) |
| *G06F 1/16* | (2006.01) |
| *H01R 13/447* | (2006.01) |

(52) U.S. Cl.
CPC ............. *H01R 13/60* (2013.01); *H01R 13/501* (2013.01); *G06F 1/1656* (2013.01); *H01R 13/447* (2013.01); *H01R 2201/06* (2013.01)
USPC ...................................................... 439/131

(58) Field of Classification Search
USPC ........................................................ 439/131
See application file for complete search history.

(56) References Cited

U.S. PATENT DOCUMENTS

| | | | | |
|---|---|---|---|---|
| 5,499,923 | A * | 3/1996 | Archibald et al. | 439/26 |
| 5,538,442 | A * | 7/1996 | Okada | 439/676 |
| 5,562,504 | A * | 10/1996 | Moshayedi | 439/131 |
| 5,634,802 | A * | 6/1997 | Kerklaan | 439/131 |
| 5,692,914 | A * | 12/1997 | Mitani et al. | 439/131 |
| 6,000,957 | A * | 12/1999 | Betker et al. | 439/131 |
| 6,273,735 | B1 * | 8/2001 | Johnson et al. | 439/131 |
| 6,398,564 | B1 * | 6/2002 | Wong | 439/131 |
| 6,561,824 | B1 * | 5/2003 | Beckham et al. | 439/131 |
| 6,773,291 | B1 * | 8/2004 | Roth et al. | 439/344 |
| 6,905,351 | B1 * | 6/2005 | Wang et al. | 439/131 |
| 6,935,877 | B2 * | 8/2005 | Liao | 439/170 |
| 7,074,061 | B1 * | 7/2006 | Roth et al. | 439/131 |
| 7,108,562 | B2 * | 9/2006 | Liao | 439/676 |

(Continued)

FOREIGN PATENT DOCUMENTS

TW    201042863    12/2010

*Primary Examiner* — Neil Abrams
*Assistant Examiner* — Travis Chambers
(74) *Attorney, Agent, or Firm* — Jianq Chyun IP Office (57) ABSTRACT

A portable electronic device including a main body and a connecting port is provided. The main body has an containing cavity. The connecting port includes a base and at least one movable component. The base is disposed at the main body. The movable component is movably connected to the base and moves between an accommodated position and an operation position relatively to the base. When the movable component is located at the accommodated position, the height of the connecting port is less than or equal to the height of the containing cavity such that the connecting port is adapted to be accommodated in the containing cavity. When the movable component is located at the operation position, the height of the connecting port is greater than the height of the containing cavity, and a connector is adapted to be fixed between the base and the movable component.

18 Claims, 6 Drawing Sheets

(56) References Cited

U.S. PATENT DOCUMENTS

| | | | |
|---|---|---|---|
| 7,374,437 B2* | 5/2008 | Reid et al. | 439/131 |
| 7,458,830 B2* | 12/2008 | Reid et al. | 439/131 |
| 2001/0019907 A1* | 9/2001 | Glad et al. | 439/131 |
| 2012/0052704 A1* | 3/2012 | Yen | 439/131 |

* cited by examiner

PORTABLE ELECTRONIC DEVICE AND CONNECTING PORT THEREOF

CROSS-REFERENCE TO RELATED APPLICATION

This application claims the priority benefit of U.S. provisional application Ser. No. 61/514,456, filed Aug. 2, 2011. The entirety of the above-mentioned patent application is hereby incorporated by reference herein and made a part of this specification.

BACKGROUND OF THE INVENTION

1. Field of the Invention

The invention generally relates to an electronic device and a connecting port thereof, and more particularly, to a portable electronic device and a connecting port thereof.

2. Description of Related Art

Along with the rapid development of science and technology, portable devices such as tablet computers or notebook computer (laptop) have been broadly used due to portable carrying and easy operation. Most of the notebooks are equipped with Internet connecting ports for connecting, for example, RJ45 Internet cable-connectors.

The Internet connecting port of a notebook computer is mostly disposed at a side edge thereof, so that the thickness of the chassis must be greater than the thickness of the connecting port to entirely enclose the connecting port. In other words, the thickness of the notebook's side-wall should be at least equal to the thickness of the chassis plus the thickness of the connecting port so as to successfully dispose the connecting port at the notebook computer. In more details, the universal norm height of the current RJ45 connecting port is about 9.5 mm-11 mm. In order to dispose the RJ45 connecting port at a notebook computer, the thickness of the chassis thereof must be greater than the universal norm height of the RJ45 connecting port. It can be seen the conventional design of the connecting port directly limit the development of the notebook computer towards the slimming tendency.

SUMMARY OF THE INVENTION

Accordingly, the invention is directed to a portable electronic device with connecting port adapted to be adjusted to have a smaller height.

The invention is also directed to a connecting port adapted to be adjusted to have a smaller height.

The invention provides a portable electronic device, includes a main body and a connecting port. The main body has a containing cavity. The connecting port includes a base and at least one movable component. The base is disposed at the main body. The movable component is movably connected to the base and moves between an accommodated position and an operation position relatively to the base. When the movable component is located at the accommodated position, the height of the connecting port is less than or equal to the height of the containing cavity such that the connecting port is adapted to be accommodated in the containing cavity. When the movable component is located at the operation position, the height of the connecting port is greater than the height of the containing cavity.

The invention provides a connecting port, suitable for a portable electronic device, in which the portable electronic device includes a main body and the main body includes a containing cavity. The connecting port includes a base and at least one movable component. The base is disposed at the main body. The movable component is movably connected to the base and moves between an accommodated position and an operation position relatively to the base. When the movable component is located at the accommodated position, the height of the connecting port is less than or equal to the height of the containing cavity such that the connecting port is adapted to be accommodated in the containing cavity. When the movable component is located at the operation position, the height of the connecting port is greater than the height of the containing cavity.

In an embodiment of the present invention, the quantity of the above-mentioned at least one movable component is two and the two movable components are respectively located at two opposite sides of the base.

In an embodiment of the present invention, the above-mentioned connecting port is slidably disposed at the containing cavity, when the connecting port is located in the containing cavity, the movable component is position-limited at the accommodated position by the main body; when the connecting port slides out of the containing cavity, the movable component is adapted to move to the operation position and the connecting port is position-limited outside the containing cavity.

In an embodiment of the present invention, the above-mentioned movable component is pivoted at the base and adapted to rotate to the side-end of the base to arrive at the accommodated position or rotate to the top-end of the base to arrive at the operation position.

In an embodiment of the present invention, the above-mentioned base is fixed in the containing cavity, the movable component is adapted to move into the containing cavity to arrive at the accommodated position or outstretch out of the containing cavity to arrive at the operation position.

In an embodiment of the present invention, the above-mentioned connecting port further includes two rods, both ends of each of the rods are respectively pivoted at the base and the movable component, the movable component, the two rods and the base together form a parallel four-bar linkage mechanism, and the movable component is adapted to be lifted from the accommodated position to the operation position through the rotations of the two rods.

In an embodiment of the present invention, the above-mentioned movable component is slidably disposed at the base and adapted to slide between the accommodated position and the operation position relatively to the base.

In an embodiment of the present invention, the above-mentioned connecting port further includes an elastic component, the elastic component is connected between the main body and the movable component, and the movable component is adapted to move from the accommodated position to the operation position through the elastic force of the elastic component.

In an embodiment of the present invention, the above-mentioned connecting port further includes a position-limiting component, the position-limiting component is movably disposed at the main body and adapted to withstand the elastic force of the elastic component to limit the movable component at the accommodated position.

In an embodiment of the present invention, the above-mentioned movable component is pivoted at the base and has a clasp-lever, when the movable component rotates to the operation position, the clasp-lever is adapted to press down the connector to at the base.

Based on the description above, the connecting port of the invention includes a base and at least one movable component. The movable component can move to the accommodated position relatively to the base to adjust the connecting port to have a smaller height and can move to the operation position relatively to the base to adjust the connecting port to have a larger height. The user can move the movable component to the operation position to fix the connector between the base and the movable component so as to connect the connecting port. When the user does not use the connecting port, the movable component can be moved to the accommodated position to accommodate the movable component in the containing cavity of the main body. By the design of the connecting port with adjustable height, the thickness of the main body of the portable electronic device can be accordingly reduced to meet the slimming design tendency of the portable electronic device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
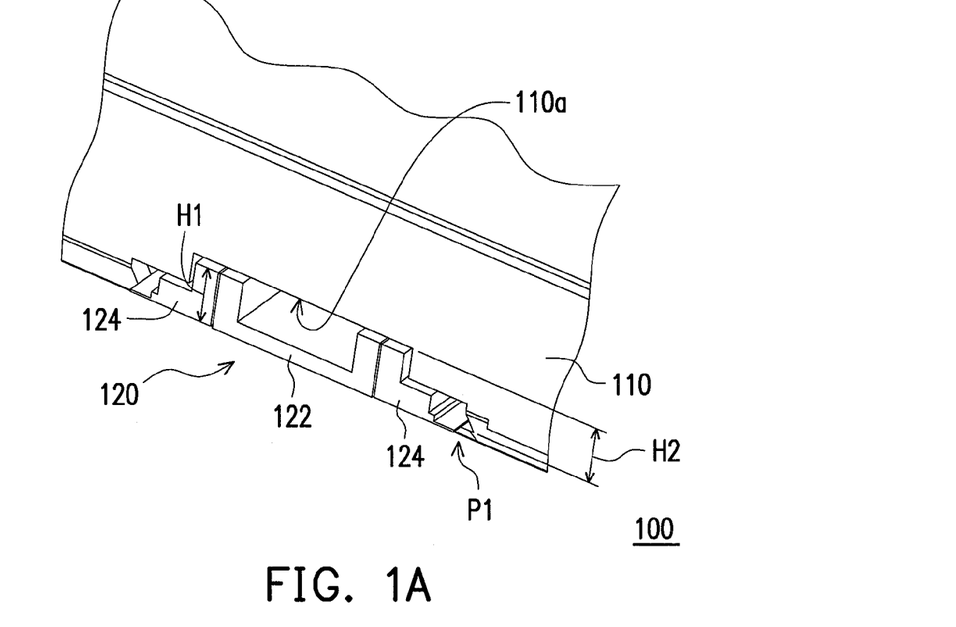
FIGS. 1A-1D are action flowcharts of a connecting port of a portable electronic device according to an embodiment of the invention.

FIGS. 1A-1D are action flowcharts of a connecting port of a portable electronic device according to an embodiment of the invention. Referring to FIG. 1A, a portable electronic device 100 of the embodiment includes a main body 110 and a connecting port 120. The main body 110 has a containing cavity 110a and the connecting port 120 includes a base 122 and at least one movable component 124 (two ones are shown). The base 122 is disposed at the main body 110 and each of the movable components 124 is movably connected to the base 122.

Figure 1B:
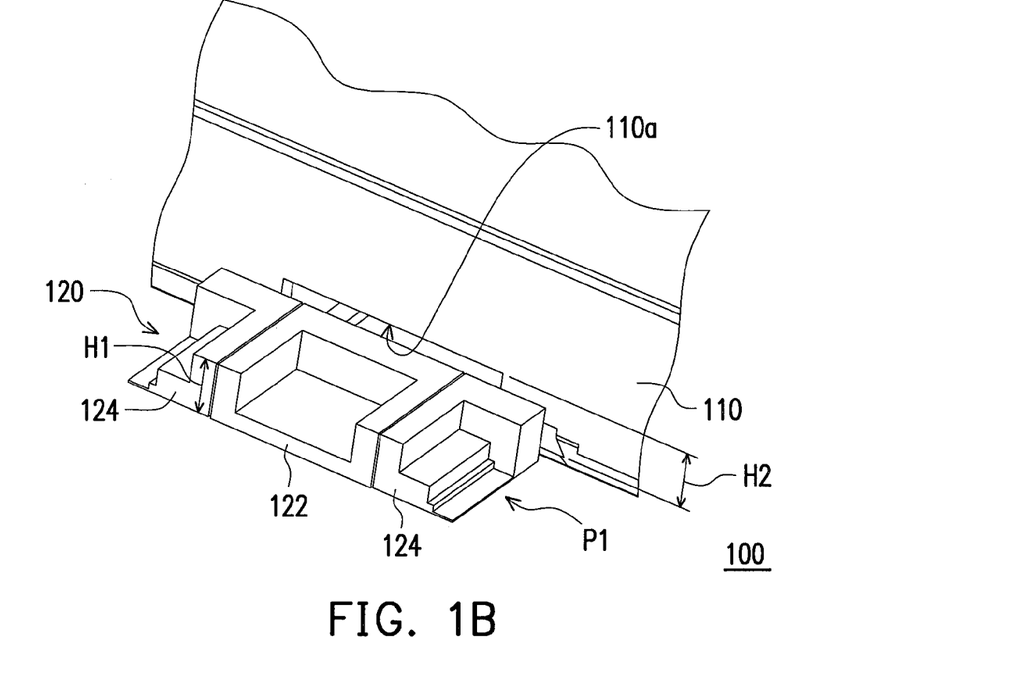
Figure 1C:
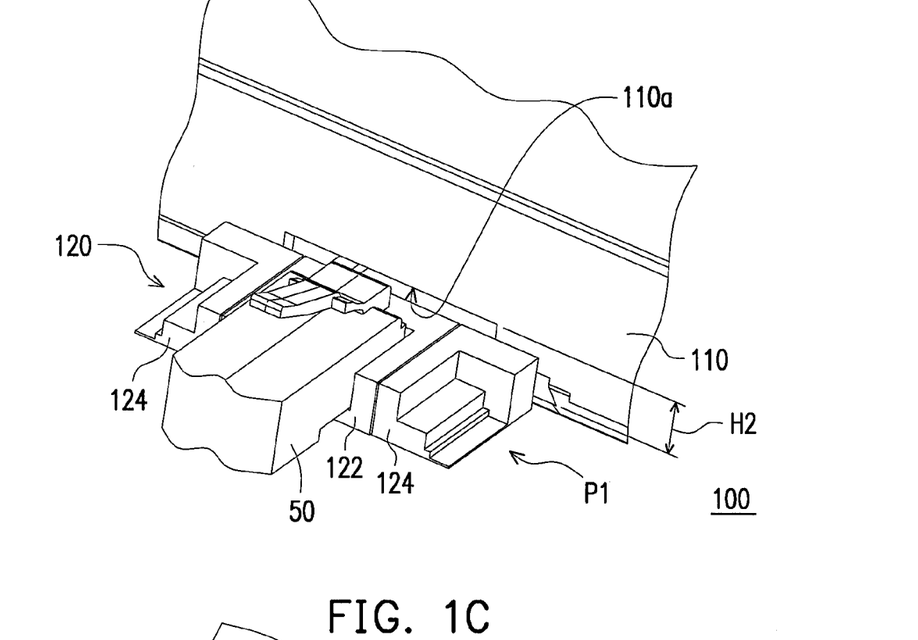
Figure 1D:
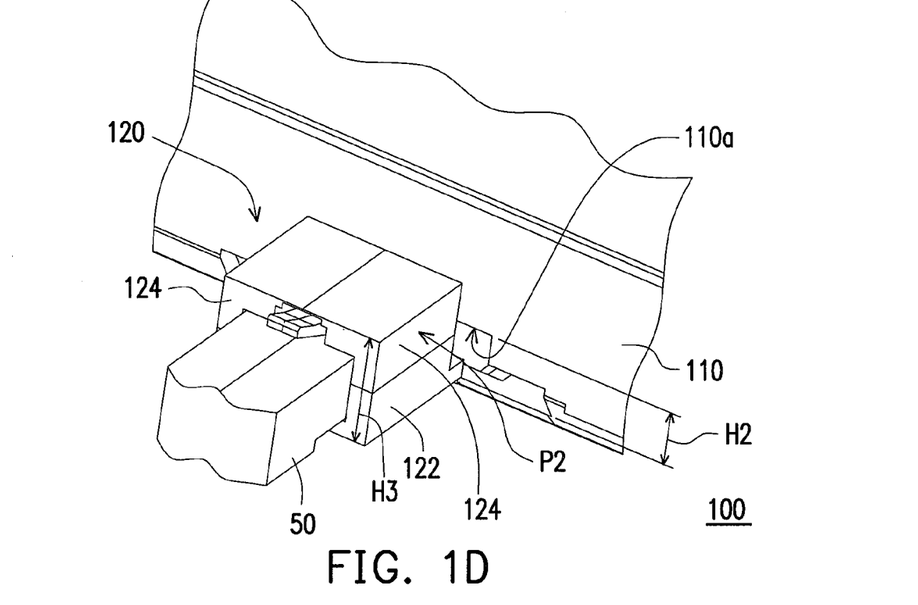

Each of the movable components 124 is adapted to move between the accommodated position P1 as shown by FIGS. 1A-1C and the operation position P2 as shown by FIG. 1D relatively to the base 122. When the movable components 124 are at the accommodated position P1, the height H1 of the connecting port 120 is less than or equal to the height H2 of the containing cavity 110a such that the connecting port 120 is adapted to be accommodated in the containing cavity 110a as shown by FIG. 1A. When the movable components 124 are at the operation position P2, the height H3 of the connecting port 120 is greater than the height H2 of the containing cavity 110a, and a connector 50 is adapted to be fixed between the base 122 and the movable components 124 as shown by FIG. 1D.

Under the above-mentioned layout, the movable components 124 can move to the accommodated position P1 relatively to the base 122 to adjust the height of the connecting port 120 smaller (i.e., the above-mentioned height H1) and can move to the operation position P2 relatively to the base 122 to adjust the height of the connecting port 120 larger (i.e., the above-mentioned height H3). The user can move the movable components 124 to the operation position P2 to fix the connector 50 between the base 122 and the movable components 124 and connect the connector 50 to the connecting port 120. When the user does not use the connecting port 120, the user can move the movable components 124 to the accommodated position P1 so as to accommodate the movable components 124 in the containing cavity 110a of the main body 110. With the above-mentioned design of the connecting port 120 with adjustable height, the thickness of the main body 110 of the portable electronic device 100 can be accordingly reduced to meet the slimming design tendency of the portable electronic device.

The portable electronic device 100 of the embodiment is, for example, a notebook computer and the main body 110 is the host of the notebook computer. The opening of the containing cavity 110a is at the side of the above-mentioned host. The connecting port 120 is, for example, an Internet connecting port and the connector 50 is, for example, an RJ45 Internet cable-connector. In other embodiments, the portable electronic device 100 can be other types of devices and the connecting port 120 and connector 50 can be other types of connecting interfaces, which the invention is not limited to.

In more details, in the embodiment, the two movable components 124 are pivoted at the base 122 and respectively located at the two opposite sides of the base 122. Each of the movable components 124 is adapted to be pivoted to the side-end of the base 122 to arrive at the accommodated position P1 or to the top-end of the base 122 to arrive at the operation position P2. The connecting port 120 is slidably disposed at the containing cavity 110a to slide into the containing cavity 110a as shown by FIG. 1A, or to slide out of the containing cavity 110a as shown by FIG. 1B. When the connecting port 120 is located in the containing cavity 110a, each of the movable components 124 is position-limited at the accommodated position P1 by the main body 110. When the connecting port 120 slides out of the containing cavity 110a, the user can place the connector 50 on the base 122 as shown by FIG. 1C and move the movable components 124 to the operation position P2 as shown by FIG. 1D so as to fix the connector 50 between the base 122 and the movable components 124 and limit the position of the connecting port 120 outside the containing cavity 110a by the movable components 124.

The invention does not limit the layout and moving mechanism of the base and the movable components. In following, some implementations are described with figures.

Figure 2A:
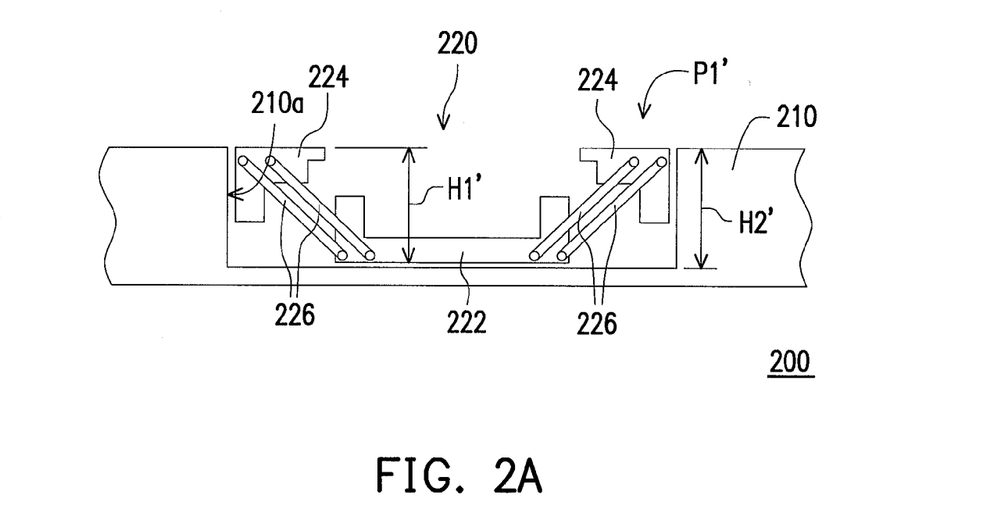
FIGS. 2A and 2B are action flowcharts of a connecting port of a portable electronic device according to another embodiment of the invention.
Figure 2B:
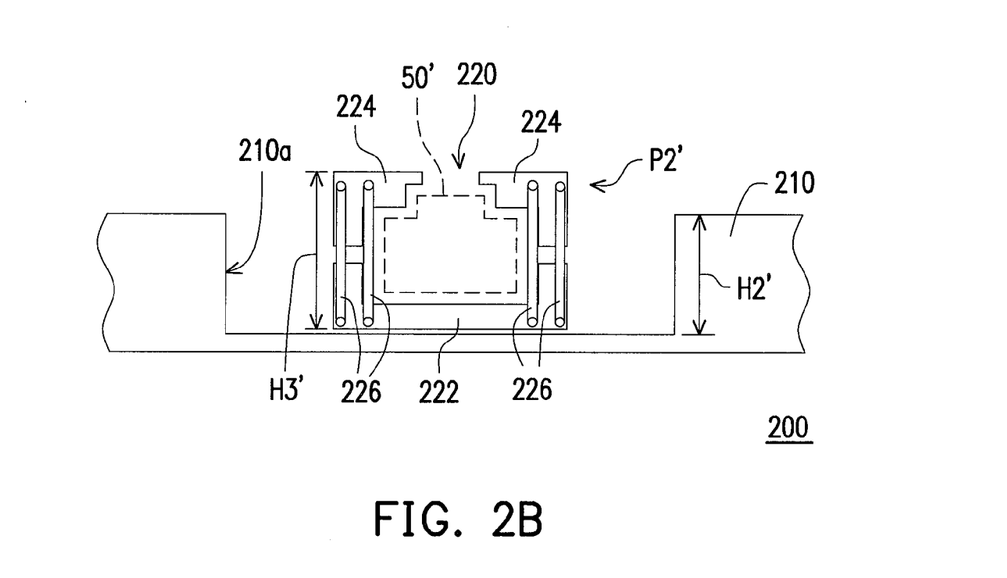

FIGS. 2A and 2B are action flowcharts of a connecting port of a portable electronic device according to another embodiment of the invention. Referring to FIG. 2A, a portable electronic device 200 of the embodiment includes a main body 210 and a connecting port 220. The main body 210 has a containing cavity 210a and the connecting port 220 includes a base 222 and at least one movable component 224 (two ones are shown). The base 222 is disposed at the main body 210 and each of the movable components 224 is movably connected to the base 222.

Each of the movable components 224 is adapted to move between the accommodated position P1' as shown by FIG. 2A and the operation position P2' as shown by FIG. 2B relatively to the base 222. When the movable components 224 are at the accommodated position P1', the height H1' of the connecting port 220 is less than or equal to the height H2' of the containing cavity 210a such that the connecting port 220 is adapted to be accommodated in the containing cavity 210a as shown by FIG. 2A. When the movable components 224 are at the operation position P2', the height H3' of the connecting port 220 is greater than the height H2' of the containing cavity 210a, and a connector 50' is adapted to be fixed between the base 222 and the movable components 224 as shown by FIG. 2B.

The portable electronic device 200 of the embodiment is, for example, a notebook computer and the main body 210 is the host of the notebook computer. The opening of the containing cavity 210a is at the top of the above-mentioned host. The connecting port 220 is, for example, an Internet connecting port and the connector 50' is, for example, an RJ45 Internet cable-connector. In other embodiments, the portable electronic device 200 can be other types of devices and the connecting port 220 and connector 50' can be other types of connecting interfaces, which the invention is not limited to.

In the embodiment, the base 222 is fixed in the containing cavity 210a, the two movable components 224 are respectively located at the two opposite sides of the base 222, and the movable components 224 move into the containing cavity 210a to arrive at the accommodated position P1' as shown by FIG. 2A or outstretch out of the containing cavity 210a as shown by FIG. 2B to arrive at the operation position P2'. The connecting port 220 further includes a plurality of rods 226, and two ones among the rods 226 are corresponding to one of the two movable components 224 and the other two ones among the rods 226 are corresponding to another of the two movable components 224. In more details, both ends of each of the rods 226 are respectively pivoted at the base 222 and the corresponding movable component 224. Each of the movable components 224, the corresponding two rods 226 and the base 222 together form a parallel four-bar linkage mechanism. The movable components 224 are adapted to be lifted from the accommodated position P1' to the operation position P2' through the rotations of the two corresponding rods 226.

Figure 3A:
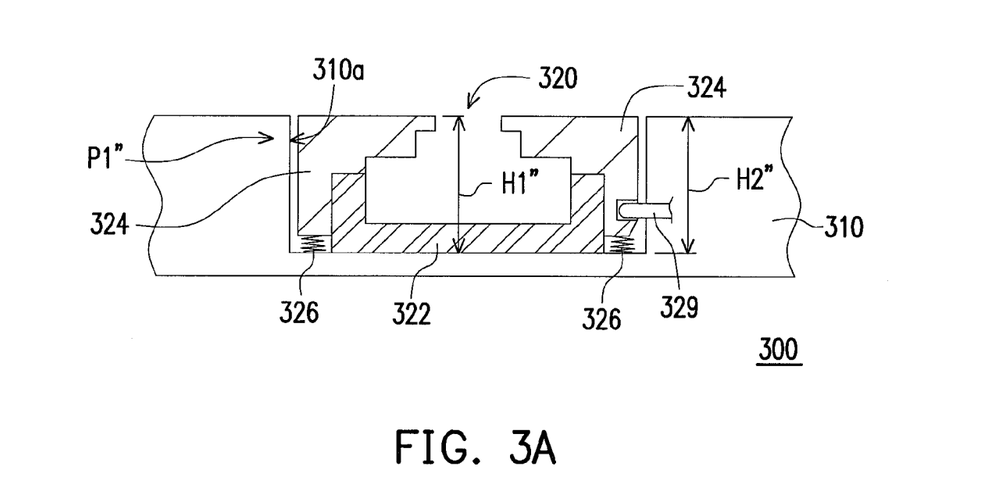
FIGS. 3A and 3B are action flowcharts of a connecting port of a portable electronic device according to yet another embodiment of the invention.
Figure 3B:
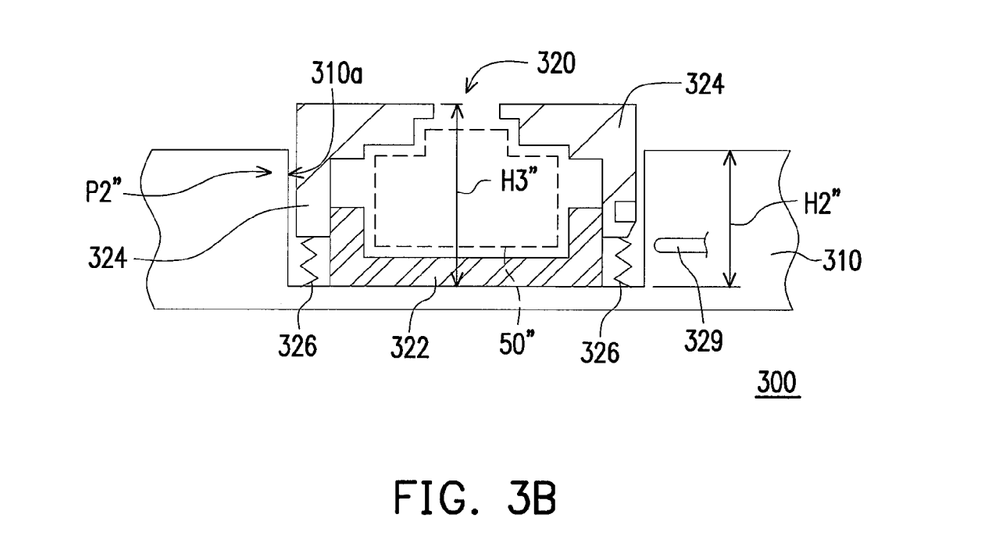

FIGS. 3A and 3B are action flowcharts of a connecting port of a portable electronic device according to yet another embodiment of the invention. Referring to FIG. 3A, a portable electronic device 300 of the embodiment includes a main body 310 and a connecting port 320. The main body 310 has a containing cavity 310a and the connecting port 320 includes a base 322 and at least one movable component 324 (two ones are shown). The base 322 is disposed at the main body 310 and each of the movable components 324 is movably connected to the base 322.

Each of the movable components 324 is adapted to move between the accommodated position P1" as shown by FIG. 3A and the operation position P2" as shown by FIG. 3B relatively to the base 322. When the movable components 324 are at the accommodated position P1", the height H1" of the connecting port 320 is less than or equal to the height H2" of the containing cavity 310a such that the connecting port 320 is adapted to be accommodated in the containing cavity 310a as shown by FIG. 3A. When the movable components 324 are at the operation position P2", the height H3" of the connecting port 320 is greater than the height H2" of the containing cavity 310a, and a connector 50" is adapted to be fixed between the base 322 and the movable components 324 as shown by FIG. 3B.

The portable electronic device 300 of the embodiment is, for example, a notebook computer and the main body 310 is the host of the notebook computer. The opening of the containing cavity 310a is at the top of the above-mentioned host. The connecting port 320 is, for example, an Internet connecting port and the connector 50" is, for example, an RJ45 Internet cable-connector. In other embodiments, the portable electronic device 300 can be other types of devices and the connecting port 320 and connector 50" can be other types of connecting interfaces, which the invention is not limited to.

In the embodiment, the base 322 is fixed in the containing cavity 310a, the two movable components 324 are respectively located at the two opposite sides of the base 322, and the movable components 324 move into the containing cavity 310a to arrive at the accommodated position P1" as shown by FIG. 3A or outstretch out of the containing cavity 310a as shown by FIG. 3B to arrive at the operation position P2". The movable components 324 are slidably disposed at the base 322 and adapted to move between the accommodated position P1" and the operation position P2". In more details, the connecting port 320 of the embodiment further includes at least one elastic components 326 (two ones are shown). Each of the elastic components 326 is connected between the main body 310 and the corresponding movable component 324. Each of the movable components 324 can move from the accommodated position P1" to the operation position P2" through the elastic force of the corresponding elastic component 326. In addition, the connecting port 320 in the embodiment further includes a position-limiting component 329 and the position-limiting component 329 is movably disposed at the main body 310 and adapted to withstand the elastic force of the corresponding elastic component 326 to limit the position of the movable components 324 at the accommodated position P1". For example, the position-limiting component 329 is a push button slidably disposed at the main body 310. The user can push the position-limiting component 329 to the position as shown by FIG. 3A or the position as shown by FIG. 3B so as to limit the position of the movable components 324 at the accommodated position P1" or to release the movable components 324 so that the movable components 324 are up-sprung to the operation position P2".

Figure 4A:
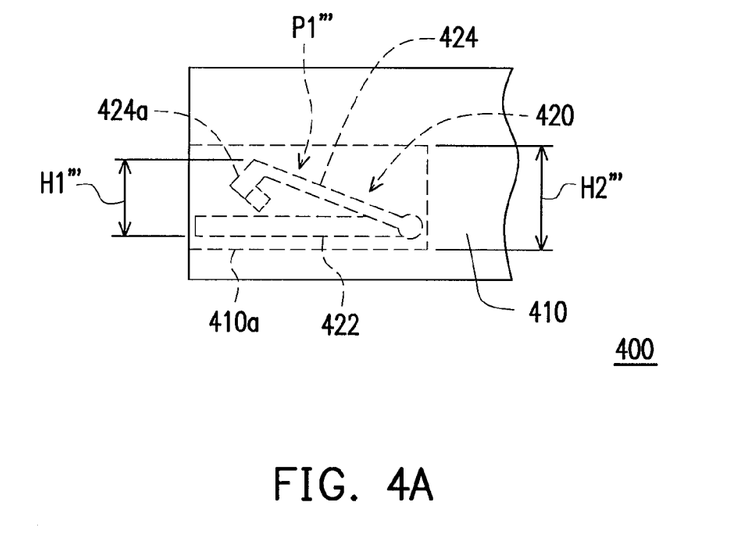
FIGS. 4A-4C are action flowcharts of a connecting port of a portable electronic device according to yet another embodiment of the invention.
Figure 4B:
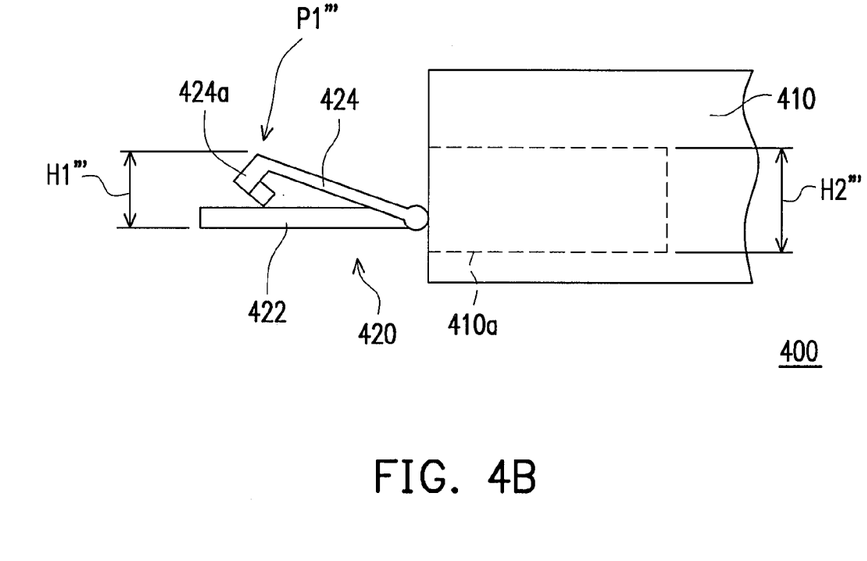
Figure 4C:
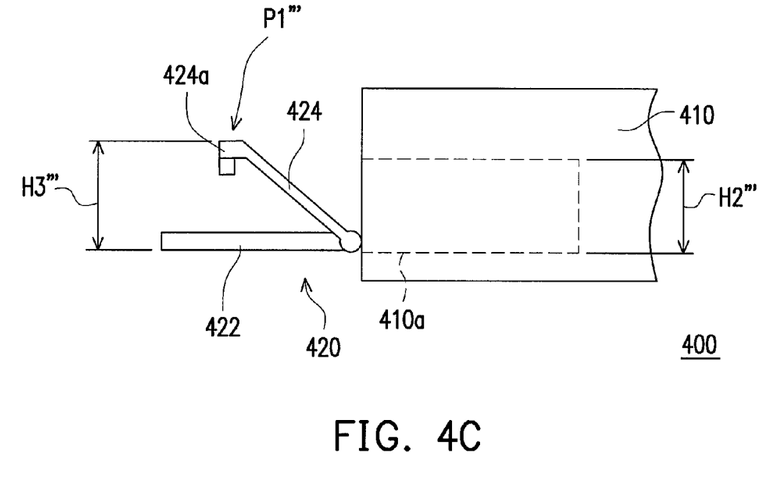
Figure 5:
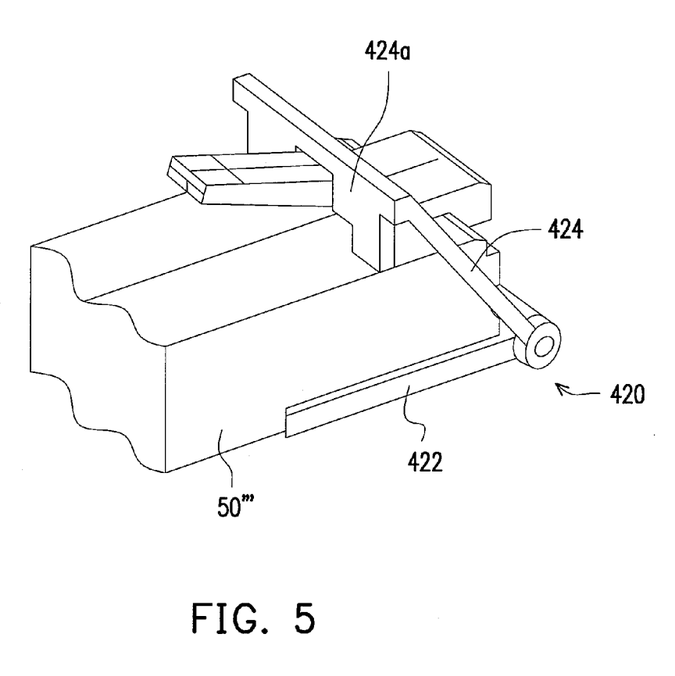
FIG. 5 is a three-dimensional diagram showing a connector is connected to the connecting port of FIG. 4C.

FIGS. 4A-4C are action flowcharts of a connecting port of a portable electronic device according to yet another embodiment of the invention and FIG. 5 is a three-dimensional diagram showing a connector is connected to the connecting port of FIG. 4C. Referring to FIG. 4A, a portable electronic device 400 of the embodiment includes a main body 410 and a connecting port 420. The main body 410 has a containing cavity 410a and the connecting port 420 includes a base 422 and at least one movable component 424 (two ones are shown). The base 422 is disposed at the main body 410 and each of the movable components 424 is movably connected to the base 422.

Each of the movable components 424 is adapted to move between the accommodated position P1'" as shown by FIGS. 4A and 4B and the operation position P2'" as shown by FIG. 4C relatively to the base 422. When the movable components 424 are at the accommodated position P1'", the height H1'" of the connecting port 420 is less than or equal to the height H2'" of the containing cavity 410a such that the connecting port 420 is adapted to be accommodated in the containing cavity 410a as shown by FIG. 4A. When the movable components 424 are at the operation position P2'", the height H3'" of the connecting port 420 is greater than the height H2'" of the containing cavity 410a, and a connector 50'" is adapted to be fixed between the base 422 and the movable components 424 as shown by FIG. 5.

The portable electronic device 400 of the embodiment is, for example, a notebook computer and the main body 410 is the host of the notebook computer. The opening of the containing cavity 410a is at the side of the above-mentioned host. The connecting port 420 is, for example, an Internet connecting port and the connector 50'" is, for example, an RJ45 Internet cable-connector. In other embodiments, the portable electronic device 400 can be other types of devices and the connecting port 420 and connector 50''' can be other types of connecting interfaces, which the invention is not limited to.

In more details, in the embodiment, the movable components 424 are pivoted at the base 422 and each of the movable components 424 has a clasp-lever 424a. When the movable components 424 are rotated to the operation position P2''' as shown by FIGS. 4C and 4, the clasp-levers 424a of the movable components 424 are adapted to press down the connector 50''' at the base 422 to fix the connector 50''' at the connecting port 420.

In summary, the connecting port of the invention includes a base and at least one movable component, the movable component can move to the accommodated position relatively to the base to adjust the connecting port to have a smaller height and can move to the operation position relatively to the base to adjust the connecting port to have a larger height. The user can move the movable component to the operation position to fix the connector between the base and the movable component so as to connect the connecting port. When the user does not use the connecting port, the movable component can be moved to the accommodated position to accommodate the movable component in the containing cavity of the main body. By the design of the connecting port with adjustable height, the thickness of the main body of the portable electronic device can be accordingly reduced to meet the slimming design tendency of the portable electronic device.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A portable electronic device, comprising:
   a main body, having a containing cavity; and
   a connecting port, comprising:
      a base, disposed at the main body;
      at least one movable component, movably connected to the base and moving between an accommodated position and an operation position relatively to the base, wherein when the movable component is located at the accommodated position, height of the connecting port is less than or equal to height of the containing cavity such that the connecting port is adapted to be accommodated in the containing cavity; and when the movable component is located at the operation position, height of the connecting port is greater than height of the containing cavity; and
      two rods, wherein both ends of each of the rods are respectively pivoted at the base and the movable component, the movable component, the two rods and the base together form a parallel four-bar linkage mechanism, and the movable component is adapted to be lifted from the accommodated position to the operation position through the rotations of the two rods.

2. The portable electronic device as claimed in claim 1, wherein quantity of the at least one movable component is two and the two movable components are respectively located at two opposite sides of the base.

3. The portable electronic device as claimed in claim 1, wherein the connecting port is slidably disposed at the containing cavity, when the connecting port is located in the containing cavity, the movable component is position-limited at the accommodated position by the main body; and when the connecting port slides out of the containing cavity, the movable component is adapted to move to the operation position and the connecting port is position-limited outside the containing cavity by the movable component.

4. The portable electronic device as claimed in claim 1, wherein the movable component is pivoted at the base and adapted to rotate to a side-end of the base to arrive at the accommodated position or rotate to a top-end of the base to arrive at the operation position.

5. The portable electronic device as claimed in claim 1, wherein the base is fixed in the containing cavity, the movable component is adapted to move into the containing cavity to arrive at the accommodated position or outstretch out of the containing cavity to arrive at the operation position.

6. The portable electronic device as claimed in claim 1, wherein the movable component is pivoted at the base and has a clasp-lever, and when the movable component rotates to the operation position, the clasp-lever is adapted to press down a connector to at the base.

7. The portable electronic device as claimed in claim 1, wherein the movable component is slidably disposed at the base and adapted to slide between the accommodated position and the operation position relatively to the base.

8. The portable electronic device as claimed in claim 7, wherein the connecting port further comprises an elastic component, the elastic component is connected between the main body and the movable component, and the movable component is adapted to move from the accommodated position to the operation position through the elastic force of the elastic component.

9. The portable electronic device as claimed in claim 8, wherein the connecting port further comprises a position-limiting component, the position-limiting component is movably disposed at the main body and adapted to withstand the elastic force of the elastic component to limit the movable component at the accommodated position.

10. A connecting port, suitable for a portable electronic device, wherein the portable electronic device comprises a main body and the main body comprises a containing cavity; the connecting port comprising:
   a base, disposed at the main body;
   at least one movable component, movably connected to the base and moving between an accommodated position and an operation position relatively to the base, wherein when the movable component is located at the accommodated position, height of the connecting port is less than or equal to height of the containing cavity such that the connecting port is adapted to be accommodated in the containing cavity; and when the movable component is located at the operation position, height of the connecting port is greater than height of the containing cavity; and
   two rods, wherein both ends of each of the rods are respectively pivoted at the base and the movable component, the two rods and the base together form a parallel four-bar linkage mechanism, and the movable component is adapted to be lifted from the accommodated position to the operation position through the rotations of the two rods.

11. The connecting port as claimed in claim 10, wherein quantity of the at least one movable component is two and the two movable components are respectively located at two opposite sides of the base.

12. The connecting port as claimed in claim 10, wherein the connecting port is slidably disposed at the containing cavity, when the connecting port is located in the containing cavity, the movable component is position-limited at the accommodated position by the main body; when the connecting port slides out of the containing cavity, the movable component is adapted to move to the operation position and the connecting port is position-limited outside the containing cavity.

13. The connecting port as claimed in claim 10, wherein the movable component is pivoted at the base and adapted to rotate to a side-end of the base to arrive at the accommodated position or rotating to a top-end of the base to arrive at the operation position.

14. The connecting port as claimed in claim 10, wherein the base is fixed in the containing cavity, the movable component is adapted to move into the containing cavity to arrive at the accommodated position or outstretch out of the containing cavity to arrive at the operation position.

15. The connecting port as claimed in claim 10, wherein the movable component is pivoted at the base and has a clasp-lever, and when the movable component rotates to the operation position, the clasp-lever is adapted to press down a connector to at the base.

16. The connecting port as claimed in claim 10, wherein the movable component is slidably disposed at the base and adapted to slide between the accommodated position and the operation position relatively to the base.

17. The connecting port as claimed in claim 16, wherein the connecting port further comprises an elastic component, the elastic component is connected between the main body and the movable component, and the movable component is adapted to move from the accommodated position to the operation position through the elastic force of the elastic component.

18. The connecting port as claimed in claim 17, wherein the connecting port further comprises a position-limiting component, the position-limiting component is movably disposed at the main body and adapted to withstand the elastic force of the elastic component to limit the movable component at the accommodated position.

* * * * *